April 30, 1940.     A. O. COBBS     2,198,718
CERTIFICATE HOLDER
Filed March 6, 1939
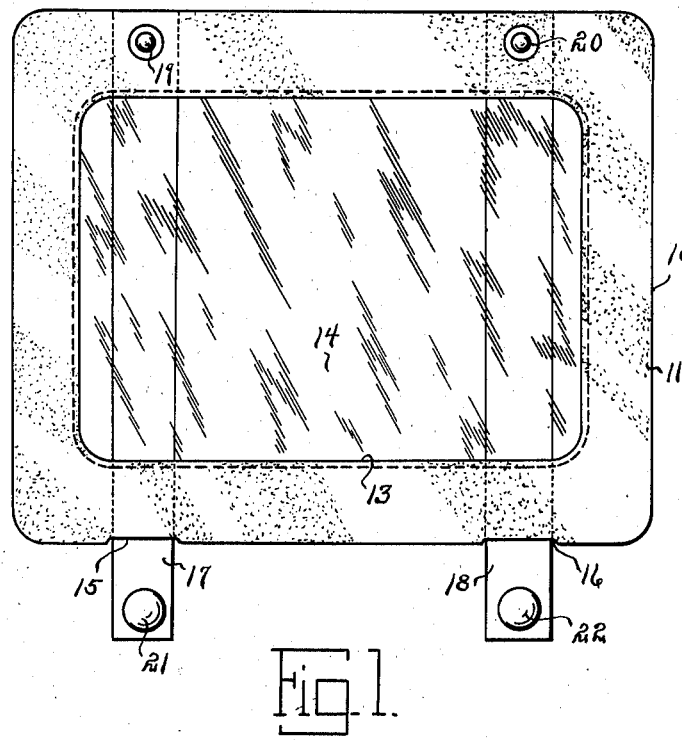
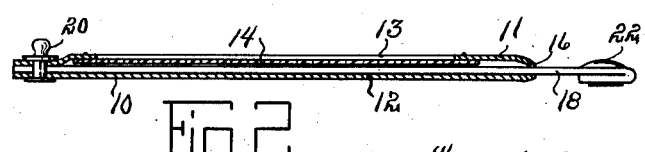
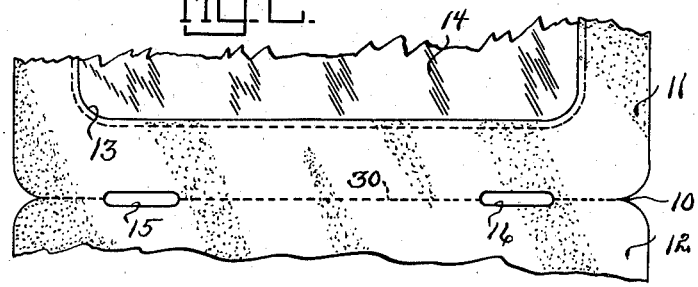
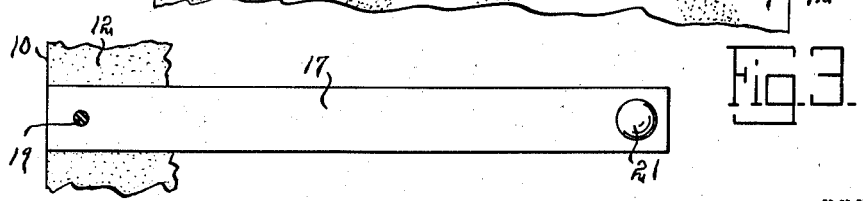
INVENTOR.
A. O. COBBS
BY M. Talbert Dick
ATTORNEY.

Patented Apr. 30, 1940

2,198,718

UNITED STATES PATENT OFFICE 2,198,718

CERTIFICATE HOLDER

Ansalem Orville Cobbs, Des Moines, Iowa

Application March 6, 1939, Serial No. 259,978

5 Claims. (Cl. 40—10)

The principal object of my invention is to provide an identification or certificate holder for automotive vehicles such as busses, trucks, automobiles and the like that is capable of being easily and quickly attached around or detached from the steering column of such vehicle.

A further object of this invention is to provide a wrap-on certificate holder that will be successfully held in a neat and flattened condition around the steering wheel column of an automotive vehicle.

A still further object of my invention is to provide an identification or certificate holder that when once placed around the steering column of an automotive vehicle will have no objectionable outwardly extending elements, prongs, projections or like to catch on the clothes or person of those riding in the seating compartment of the vehicle.

A still further object of my invention is to provide a simple, visible certificate holder for vehicles that may be easily installed or removed without in any way damaging or marring the vehicle to which it is secured.

A still further object of my invention is to provide an identification or certificate holder that is refined in appearance, economical in manufacture, and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a top plan view of my certificate holder ready for use.

Fig. 2 is a longitudinal cross sectional view of the certificate holder and more fully illustrates its construction.

Fig. 3 is a plan view of a section of my certificate holder case portion before complete assembly.

Fig. 4 is a top plan view of one of the resilient fastening straps.

Wrap-on certificate holders are not new in the art as I personally have had issued to me several patents in this art. However, in many instances, these wrap-on certificate holders do not fit neatly around the steering column of the vehicle, have objectionable hooks or protrusions and are not economically manufactured. I have overcome such objections as hereinafter will be appreciated.

The body portion of my certificate holder is made from a single sheet 10 of leather, imitation leather or similar flexible sheet material. The certificate housing is created by folding the cut sheet material back over and upon itself to produce a front flat section 11 and a back flat section 12 as shown in Fig. 2. Fig. 3 shows the dotted line 30 on which the sheet 10 is folded to create the front portion 11 and the back portion 12. The front portion has a window 13 cut out of its central area as shown in Fig. 1. This window 13 is enclosed by a transparent sheet member 14 of Celluloid or like clear flexible sheet material. The numeral 15 designates a slot cut on the dotted line 30 and near the left side of the holder 15 as shown in Fig. 3. The numeral 16 designates a similar slot opening cut in the holder on the dotted line 30 and near the right side of the holder. These two slot openings 15 and 16 extend longitudinally of the dotted line 30 and are spaced apart from each other. The numeral 17 designates an elongated strip or bar of flexible resilient material such as elastic tape. This resilient flat bar 17 rests between the upper portion 11 and the lower portion 12 and protrudes through the slot opening 15. The member 17 extends longitudinally of the holder and is located near the left side of the holder. The numeral 18 designates a similar elongated flat resilient tape resting between the upper portion 11 and the lower portion 12 and protruding through the slot opening 16. These two members 17 and 18 are parallel with each other and extend between the upper and bottom sheets of the holder to the other end of the holder opposite from the slot holes 15 and 16 as shown in Fig. 1. The numeral 19 designates an ordinary glove snap fastener rivet extending through the back portion 12, the member 17 and the upper portion 11. The numeral 20 designates a similar glove snap fastener rivet extending through the portion 12, the member 18 and the portion 11. These rivets 19 and 20 are put into place by the usual machinery for such purposes and when the rivets are once in place, the straps 17 and 18 will not only be secured to the holder but the free flat end portions of the portions 11 and 12 will be secured together, thereby providing a compartment for a certificate or like between the portions 11 and 12 and below the transparent window 14. The members 19 and 20 have their receiving knob heads extending above the outer surface of the portion 11. The numeral 21 designates a glove snap fastener socket rivet extending through the free end of the strap 17. The numeral 22 designates a similar element extending through the strap 18.

To use my device, it is merely necessary to put the identification card or certificate in between the portions 11 and 12. This may be accomplished by inserting the same into either side of the holder. After the certificate or like is placed within the holder with its indicia adjacent the transparent window 14, the indicia on the certificate may be easily and quickly read through the transparent window 14. With the certificate or like in place, it is then merely necessary to wrap the holder around the steering wheel column of the vehicle with the front 11 to the outside, and pull and stretch the flexible resilient strap bars 17 and 18 on and around the steering column and snap them in the usual manner onto the head portions of the member 19 and 20. With the member 21 engaging the member 19 and with the member 22 engaging the member 20, a certificate holder will be yieldingly held on and around the steering column. By the elastic bands 17 and 18 extending longitudinally completely across the portion 12, the entire holder will be held neatly and closely around the steering column and there will be no objectionable protrusions, hooks, springs, or like extending from the holder. In placing the certificate inside the holder, the certificate should be placed over those portions of the lengths of the straps that extend between the portions 11 and 12. By fastening the straps 17 and 18 at one end and permitting them to extend completely through the holder, the maximum amount of length of straps may be used thereby providing a great amount of elasticity. By my construction, the resilient straps 17 and 18 completely embrace the steering wheel column of the vehicle.

Some changes may be made in the construction and arrangement of my improved certificate holder without departing from the real spirit and purpose of my invention, and it is my intention to cover by my claims any modified forms of structure or use of mechanical equivalents which may be reasonably included within their scope.

I claim:

1. In a device of the class described, a single elongated strip of flexible material doubled back upon itself near its center to form a back portion and a front portion of a certificate holder; said certificate holder having two spaced apart slot openings on its fold line between said back and front portions, two elongated flexible elastic members resting between said front and back portions and protruding from said two slot openings respectively, glove snap fastener elements for securing said back and front portions and said elongated elastic members together, and complementary glove snap fasteners on the free ends of said elongated, elastic members.

2. In a device of the class described, a single elongated strip of flexible material doubled back upon itself near its center to form a back portion and a front portion of a certificate holder; said certificate holder having two spaced apart slot openings on its fold line between said back and said front portion, two elongated flexible resilient members resting between said front and back portions and protruding from said two slot openings respectively, glove snap fastener elements for securing said back and front portions and said elongated members together near the free ends of said front and back portions, and complementary glove snap fasteners on the free ends of said flexible resilient members.

3. In a device of the class described, a certificate holder consisting of a back and a front portion and having an opening between its front and back portions, an elongated, flat strip of flexible, elastic material resting between said front portion and said back portion and extending in one direction through said opening, and glove snap fastener elements for securing said back and front portions and said elongated strip together and operatively attaching the two ends of said elongated, flat strip of flexible, elastic material together at times.

4. In a device of the class described, a single elongated strip of flexible material doubled back upon itself near its center to form a back portion and a front portion of a certificate holder; said certificate holder having a slot opening on its fold line, an elongated, flexible elastic member resting between said front and back portions and protruding from said slot opening, a glove fastener element for securing said back and front portions and said elongated member together near the flexible ends of said front and back portions, and a complementary glove snap fastener on the free end of said flexible, elastic member.

5. In a device of the class described, a single elongated strip of flexible material doubled back upon itself near its center to form a back portion and a front portion of a certificate holder; said front portion having an opening, a sheet of transparent flexible material for closing said opening, a flat elongated strip of flexible elastic material having a portion of its length resting between said front portion and said back portion, a means for securing said front and back portions together to form a pocket, a means for securing one end of said elastic strip to said certificate holder, and a means for operatively securing the two ends of said elastic strip together at times.

ANSALEM ORVILLE COBBS.